(12) United States Patent
Abrahamsson et al.

(10) Patent No.: US 9,136,986 B2
(45) Date of Patent: Sep. 15, 2015

(54) CONTROLLING RETRANSMISSIONS IN A TELECOMMUNICATIONS SYSTEM

(75) Inventors: Richard Abrahamsson, Knivsta (SE); Lisa Boström, Solna (SE); George Jöngren, Stockholm (SE); Magnus Stattin, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 959 days.

(21) Appl. No.: 13/318,141

(22) PCT Filed: Jul. 8, 2011

(86) PCT No.: PCT/SE2011/050929
§ 371 (c)(1),
(2), (4) Date: Oct. 29, 2011

(87) PCT Pub. No.: WO2012/047147
PCT Pub. Date: Apr. 12, 2012

(65) Prior Publication Data
US 2013/0010587 A1    Jan. 10, 2013

Related U.S. Application Data

(60) Provisional application No. 61/389,437, filed on Oct. 4, 2010.

(51) Int. Cl.
*H04L 1/18* (2006.01)
*H04L 5/00* (2006.01)
*H04L 1/12* (2006.01)

(52) U.S. Cl.
CPC ............ *H04L 1/1864* (2013.01); *H04L 1/1896* (2013.01); *H04L 5/0053* (2013.01); *H04L 2001/125* (2013.01)

(58) Field of Classification Search
None
See application file for complete search history.

(56) References Cited

U.S. PATENT DOCUMENTS

| 2005/0136919 | A1  | 6/2005  | Park et al. |
| 2007/0177569 | A1  | 8/2007  | Lundby |
| 2009/0034487 | A1  | 2/2009  | Lohr et al. |
| 2009/0268707 | A1  | 10/2009 | Pani et al. |
| 2010/0232373 | A1  | 9/2010  | Nory et al. |
| 2013/0021898 | A1* | 1/2013  | Kang et al. ............. 370/216 |

FOREIGN PATENT DOCUMENTS

| CN | 101472300 A   | 7/2009 |
| WO | 2009/116754 A2 | 9/2009 |
| WO | 2011/014732 A2 | 2/2011 |

OTHER PUBLICATIONS

EPO, Int'l Search Report in PCT/SE2011/050929, Dec. 16, 2011.
EPO, Written Opinion in PCT/SE2011/050929, Dec. 16, 2011.
Samsung, HARQ Handling in UL MIMO, R1-102209, Apr. 12, 2010, 3GPP RAN WG1 Meeting 60bis, Beijing, CN.
Zte et al., Disabled TB Issue w.r.t. UL MIMO, R2-110262, Jan. 17, 2011, 3GPP RAN WG2 Meeting 72bis, Dublin.

* cited by examiner

*Primary Examiner* — Jackie Zuniga Abad

(57) ABSTRACT

The present disclosure relates to a method and arrangement for controlling re-transmission in a user equipment supporting uplink spatial multiplexing. The user equipment can detect an uplink grant on a physical downlink control channel, the uplink grant being valid for at least one transport block. The UE can also detect that at least one transport block is disabled, such that no grant is associated with the at least one transport block. The UE can interpret the at least one disabled transport block as an acknowledgement, ACK, of a previous transmission corresponding to the disabled transport block irrespective of which indication is received on the reception status feedback channel for the previous transmission.

6 Claims, 6 Drawing Sheets

CONTROLLING RETRANSMISSIONS IN A TELECOMMUNICATIONS SYSTEM

TECHNICAL FIELD

The present invention relates to control of retransmission in a user equipment supporting uplink spatial multiplexing.

BACKGROUND

In data communication or data storage it is common practice to transmit or store data with redundancy in a coded manner in order to improve reliability of being able to recreate the original message. The process is usually referred to as channel coding and the recovery process as channel decoding. We will refer to such a message as a code word even though in the following it does not strictly have to be encoded.

In communication systems, such as, e.g., the Long Term Evolution (LTE) system standardized by the Third Generation Partnership Project (3GPP), it is also common to combine several transmissions relating to the same code word in different transmission time intervals (TTIs) if needed to adaptively increase the level of redundancy to the transmission conditions. This can for instance be done by repeating a shorter coded or uncoded message one or several times. An alternative is to transmit a part of a code word containing sufficient information for correct decoding under favorable conditions, in a first transmission attempt. If not received and decoded correctly, additional parts of the code word can be transmitted in subsequent attempts after which the received parts of the code word can be recombined on the receiver side, creating a redundancy which is incremental for each retransmission. This can then help in making sure that sufficient but not more resources than necessary are used for transmission of each message. For brevity we will refer to subsequent transmissions of the same code words as retransmissions even though it may not be the whole code word that is being retransmitted. The information bits carried by a code word will be referred to as a transport block (TB).

In order for transmission of subsequent code words not to be delayed while waiting for previous messages being decoded and potentially being (partly) retransmitted, a set of buffers containing the data of different code words exist in parallel. This way other buffers can be read for (re)transmission while waiting for the previous transmission of the same transport block to be decoded and for messages of correct/incorrect reception to be received at the transmitter side (acknowledged (ACK) or not acknowledged (NACK) messages). These buffers are usually referred to as Hybrid Automatic Repeat reQuest (Hybrid ARQ or HARQ) buffers and the process controlling each of them is referred to as a HARQ process.

HARQ re-transmissions are handled by the Medium Access Control (MAC) layer which is part of Layer 2 (L2) in the LTE protocol architecture. HARQ feedback, i.e. ACK or NACK indication, is signaled to the MAC layer from the physical layer, also referred to as Layer 1. Layer 2 uses this information in its data transfer process to either make a retransmission or a new transmission.

Multi-antenna techniques can significantly increase the data rates and/or reliability of a wireless communication system. The performance is in particular improved if both the transmitter and the receiver are equipped with multiple antennas. This results in a multiple-input multiple-output (MIMO) communication channel and such systems and/or related techniques are commonly referred to as MIMO techniques.

One MIMO technique is Spatial Multiplexing (SM), or Single User MIMO (SU-MIMO), where one or several transport blocks relating to one specific user are simultaneously mapped (usually linearly) to one or several layers of data which in turn are mapped, potentially via channel adaptive precoders (also often linear precoders), to the different transmit antenna ports. Currently for LTE, one or two codewords, corresponding to one or two transport blocks, are mapped to the one or several layers of data. This way the spatial properties of the MIMO channel can, under favorable conditions, be exploited to transmit more data simultaneously relating to the same user, increasing the user data throughput. There may also be additional intermediate processing steps for various reasons.

In LTE Release 10 (Rel. 10), the uplink (UL), which is the communication link from user equipment to base station, or evolved NodeB (eNB) in LTE terminology, is being extended from supporting single-input single-output (SISO) to also support UL-Spatial Multiplexing (UL-SM).

As in previous releases (Rel-8 and Rel-9), an UL transmission is triggered via an uplink transmission grant transmitted on the Physical Downlink Control Channel (PDCCH). Retransmissions however can either be triggered by a full grant transmitted on the PDCCH or, if no PDCCH grant is found for the corresponding transport block, by a non-acknowledgement indication, NACK, on the Physical HARQ Indicator Channel (PHICH) indicating that the decoding of previous transmission attempt of the corresponding code word failed. The former retransmission type is usually referred to as an adaptive retransmission as the PDCCH grant format allows for specifying a new transport format (e.g., modulation constellation and code rate). The latter type of retransmission is consequently referred to as a non-adaptive retransmission as the PHICH carries only the indication of ACK or NACK of the previous transmission and gives no other signaling possibility to order the UE to use a new transport format.

In LTE, UL Synchronous HARQ is employed, which means that there is a fixed timing relation between transmission and retransmission, hence there is a direct mapping from TTI to HARQ process identity (ID) and this information is not needed in the UL grant. When there are limited PDCCH resources, the base station can therefore grant a UE an UL retransmission by a PHICH NACK alone which then has a reduced involvement of Layer 2, L2, resources compared to a grant received on the PDCCH. A drawback is that no new information on transport format can then be conveyed to the UE such as link adaptation or frequency selective rescheduling. The reliability of the PHICH channel is also lower than that of the PDCCH grant.

In the LTE downlink, DL, however, Asynchronous HARQ is employed, and an explicit PDCCH assignment is needed to point out that a DL (re)transmission is related to a specific DL HARQ process. For DL spatial multiplexing there is therefore always an assignment for retransmission of any code word.

This means that for LTE when DL spatial multiplexing is configured, the physical layer, or Layer 1, L1, of the UE reads the PDCCH for a DL assignment and when a downlink assignment is detected, it will furthermore detect if the assignment is valid for one or two transport blocks. This means that if the PDCCH signaling indicates no assignment for one of the transport blocks, for example TB1, the UE will not read the Physical Downlink Shared Channel (PDSCH) for data for this transport block. For TB2 it will however read the PDSCH according to the PDCCH to detect the corresponding code word that represents data. The data is then forwarded to L2, or the Medium Access Control (MAC) layer, and the appropriate HARQ process for decoding.

In the case where UL-SM is configured, the UE may, for each TTI, be assigned an UL grant that is valid for one or two TBs. It is assumed that L1 will detect if the grant is valid for one or two TB(s) based on the explicit PDCCH signaling, similar to how it is done for DL spatial multiplexing. The reason for disabling a transport block may be that the UE buffer might be empty, or the MIMO channel may not be sufficiently rich to be able to convey multiple data layers.

It should be noted that for spatial multiplexing the notion of a single grant valid for one or two transport blocks is practically equivalent to that of one or two grants valid for one transport block each. The difference is only semantic, and is henceforth used interchangeably.

The current 3GPP MAC Layer specification procedure for UL data transfer is able to handle only one UL grant (or lack of UL grant) per TTI, hence some complication can be expected when one transport block is assigned an UL grant and the other is not. Since these two branches are mutually exclusive in the current specifications, it would be more straightforward to handle each transport block separately, i.e., to assume that L2 receives individual grants per transport block and that each transport block is associated with a separate HARQ process. That way, the grant reception procedure should be iterated once for each grant associated with a certain TTI.

Assuming that the procedure is executed separately for each transport block, the different branches could be executed for the different cases of one transport block, e.g., TB1, having no UL grant and the other transport block, e.g., TB2, having an UL grant.

SUMMARY

Since Layer 1, L1, forwards only grants to Layer 2, L2, and not absence of grants, only information of a transport block with a valid grant will be forwarded to L2 and no information whether a transport block without a valid grant was scheduled or disabled is provided. L2 will then initiate its data transfer procedure for each transport block. If a grant is received for a transport block, an adaptive retransmission or a new transmission is performed in accordance with the grant. Otherwise, if a non-acknowledgement indication, NACK, is decoded for a previous transmission in the same HARQ process for a transport block, a non-adaptive retransmission is performed. If an acknowledgement indication, ACK, is decoded for a previous transmission in the same HARQ process for a transport block, no action is taken until an uplink grant is received for said transport block. Given how re-transmissions work in the UL, the absence of a valid UL grant for one of the transport blocks in combination with a false decoding of a PHICH ACK, such that the UE erroneously detects a NACK indicating a retransmission, would cause the UE to perform a non-adaptive re-transmission, which is not a desirable behavior. It can be assumed that the problem occurs when any one of the two code words is disabled.

If no uplink grant is provided from the physical layer for a HARQ process associated with a particular subframe to a higher layer, e.g. Layer 2, the HARQ feedback on PHICH controls whether the HARQ process should perform a non-adaptive retransmission in that subframe. When PDCCH indicates a grant for only one HARQ process, e.g. due to one code word corresponding to one transport block being disabled, the control of the other HARQ process is based on PHICH signaling which is less reliable than PDCCH signaling. In such a case, the UE could mistakenly decode a NACK on PHICH that was intended to be an ACK, and based on the erroneously decoded NACK initiate a non-adaptive retransmission for that transport block.

Thus, given the two types of re-transmissions in the UL, the PDCCH grant triggered adaptive re-transmission and the PHICH NACK triggered non adaptive re-transmission, it is possible that the UE, in UL spatial multiplexing mode, is instructed to perform an adaptive re-transmission for one TB (as ordered by PDCCH), but since L2 does not get explicit information about the other TB being suspended, or disabled, it would handle that TB as that it did not get an UL grant. Executing the UL data transfer procedure for this TB, the UE can then fail to decode an ACK on PHICH and initiate a non-adaptive re-transmission for that TB as described above, even though the base station may explicitly have said that it was not needed.

The base station always has to perform the same amount of PDCCH signaling regardless of whether it wants to schedule one or both transport blocks, and it is assumed that there is no scenario where it would intentionally schedule only one transport block and want the other transport block to perform a non-adaptive re-transmission, as an adaptive re-transmission would give better performance. Since PDCCH has a much lower error rate than PHICH, a solution could take advantage of this and allow the PDCCH grant assignment to have precedence over the PHICH A/N information, even when the PDCCH states that a specific transport block is not assigned a grant.

Since L1 is assumed to already know if a transport block is disabled or not from the PDCCH, the problem that the solution presented herein identifies is that this information is not forwarded to L2, which may result in unnecessary non-adaptive retransmissions.

Therefore, the present invention aims to prevent the UE from performing an accidental non-adaptive re-transmission for one or more transport blocks.

In an aspect of the invention, a method for controlling re-transmission in a user equipment supporting uplink spatial multiplexing is provided. The method includes:
   detecting an uplink grant on a physical downlink control channel, the uplink grant being valid for at least one transport block;
   detecting that at least one transport block is disabled, such that no grant is associated with the at least one transport block; and
   interpreting the at least one disabled transport block as an acknowledgement, ACK, of previous transmission corresponding to said disabled transport block irrespective of which indication is received on the reception status feedback channel for said previous transmission.

Said detecting steps may in a specific embodiment be carried out at a first protocol layer, whereby said interpreting step comprises that the first protocol layer delivers an indication of acknowledgement, ACK, to a second protocol layer. In a specific embodiment, said indication comprises the step of setting an ACK/NACK flag to ACK. Said acknowledgement may be used as input in a HARQ process corresponding to said disabled transport block in an uplink data transfer procedure.

The first protocol layer may be a physical layer and the second protocol layer may be a higher protocol layer.

In another aspect of the invention, an arrangement in a user equipment supporting uplink spatial multiplexing for controlling re-transmission is provided. The arrangement includes a processing unit comprising circuitry configured to:
   detect an uplink grant on a physical downlink control channel, the grant being valid for at least one transport block;

detect that at least one transport block is disabled, such that no grant is associated with the at least one transport block; and interpret the at least one disabled transport block as an acknowledgement, ACK, of previous transmission corresponding to said disabled transport block irrespective of which indication is received on the reception status feedback channel for said previous transmission.

Thus, in a particular embodiment, when L1 detects that a TB is disabled (based on PDCCH signaling or some other method), it can set the A/N (ACK/NACK) bit to ACK irrespective of PHICH indication for this TB.

That way when the UL Data transfer procedure is executed when one TB has a grant for adaptive retransmission and the other has not, the TB without a grant will not accidentally cause a non-adaptive re-transmission.

Other objects, advantages, and novel features of the invention will become apparent from reading this description in conjunction with the accompanying drawings and claims.

BRIEF DESCRIPTION OF THE DRAWINGS

The foregoing and other objects, features, and advantages of the invention will be apparent from this detailed description as illustrated in the drawings.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

It should be noted that although terminology from 3GPP LTE has been used in this disclosure to exemplify the invention, this should not be seen as limiting the scope of the invention to only the aforementioned system. Other wireless systems, including Wideband Code Division Multiple Access (WCDMA), WiMax, UMB and GSM, can also benefit from embodiments of this invention.

Also note that terminology such as base station and UE should be considered non-limiting and does in particular not imply a certain hierarchical relation between the two; in general "base station" could be considered as device 1 and "UE" as device 2, and these two devices communicate with each other over a radio channel. Moreover, in the following description of embodiments of the invention, the physical protocol layer will be referred to as Layer 1 and a higher protocol layer will be referred to as Layer 2. This invention is however not limited to either Layer 1 or Layer 2.

In the following, embodiments of the invention are discussed in order to describe in detail suitable applications of the invention.

Figure 1A:
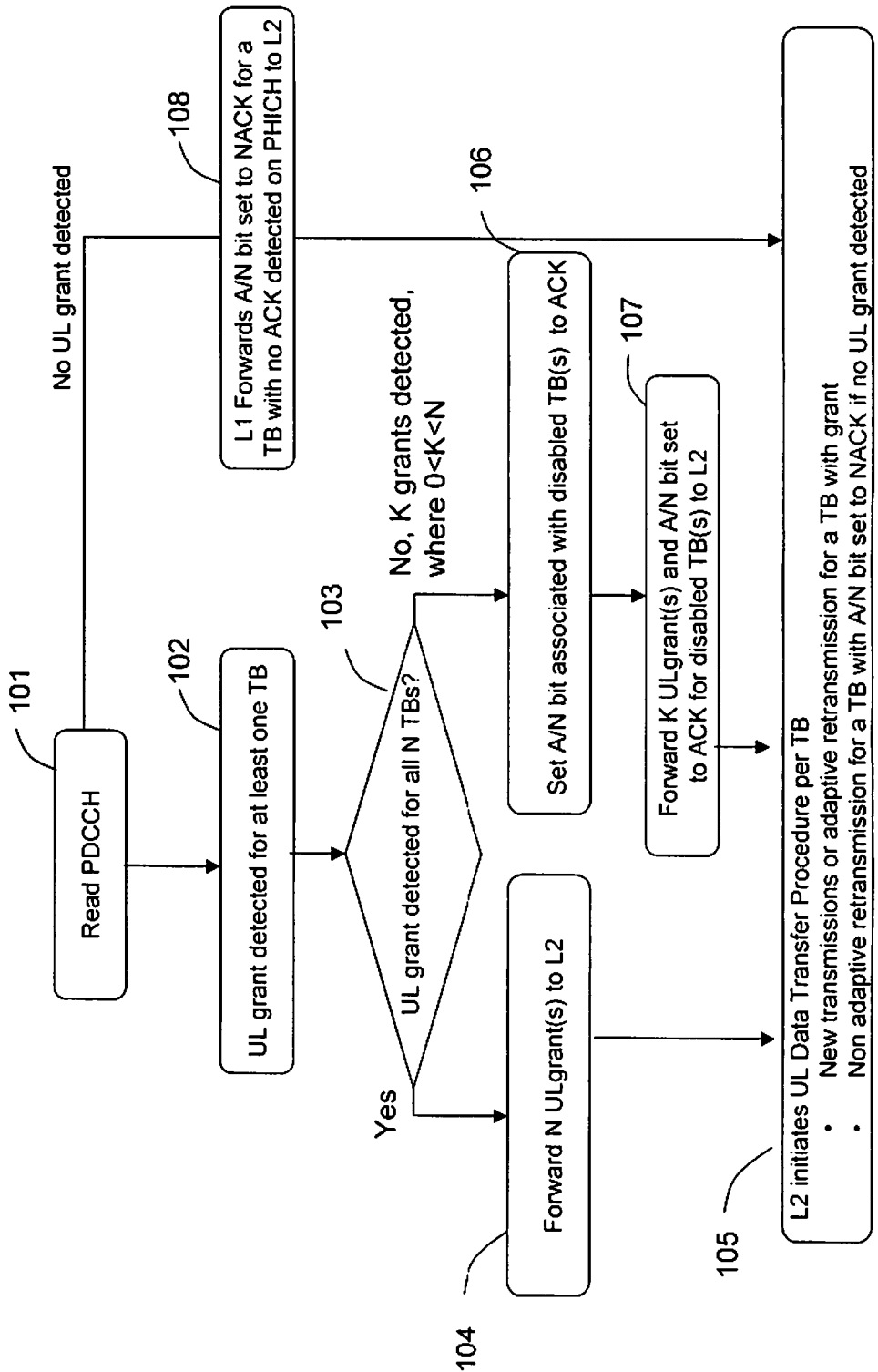
FIG. 1 shows a flow chart illustrating an embodiment of the invention.

An illustration of a method in accordance with a particular embodiment can be found in FIG. 1a. Upon reception of a downlink subframe by a UE in UL-SM mode configured with N transport blocks, such that N codewords can be spatially multiplexed, the PDCCH is read, see step 101, and a PDCCH message that indicates at least one UL grant for at least one transport block for a specific TTI is detected in step 102. If one grant for each configured transport block is detected for this TTI, see step 103, then the N grants are forwarded in step 104 for each transport block to Layer 2, where the procedure for Layer 2 UL data transfer for each transport block is iterated, or initiated, 105, thereby leading to adaptive retransmission or new code word transmission according to the associated grants. In a particular embodiment, N=2. However, N may also be a number larger than two.

If it is detected in step 103 that only K grants for N transport blocks are detected for the specific TTI, where 0<K<N, see step 103, for example that only one grant associated with a single transport block is detected for the specific TTI, say for example TB1 and not TB2 (TB1 and TB2 can of course be interchanged), then the disabled transport block, i.e. a transport block for which no grant is detected, should be interpreted such that an acknowledgement, ACK, is received for the previous transmission corresponding to the disabled transport block. According to this particular embodiment this is done such that Layer 1 sets the associated ACK/NACK flag for the previous transmission to ACK, 106, irrespective of the PHICH indication for said previous transmission and forward the available grant(s), e.g. for TB1, to Layer 2, see step 107 which will iterate, or initiate, the Layer 2 data transfer procedure for each transport block, see step 105. For a transport block with a valid grant, e.g. TB1, this will lead to an adaptive retransmission or a new code word transmission according to the associated grant. For any transport block that does not have a grant, e.g. TB2, no non-adaptive retransmission will occur since the A/N flag is set to ACK.

If on reception of the downlink subframe no grant indicating an adaptive retransmission or new transmission is detected, and if the PHICH is not decoded with ACK for previous transmission of corresponding transport block or blocks any of the code words, then Layer 1 set ACK/NACK flag to NACK for corresponding transport block or blocks and forward this to L2, see step 108, which initiates non-adaptive retransmission unless a desired or predetermined maximum number of transmissions have already been done for the corresponding code word, see step 105.

The method described above has minimal impact on the 3GPP standard specifications. The data transfer procedure on Layer 2 is unchanged, only initiated, or iterated, for each grant. Absence of both grants still means that ACK/NACKS are read to determine if non-adaptive retransmission should be made.

The above-described exemplary method uses the convention of a separate grant for each transport block and separate HARQ processes for each transport block, but an alternative method can use the convention of a single grant addressing one or two transport blocks and one HARQ process governing two code word buffers. The practical result of both methods would be the same.

Figure 1B:
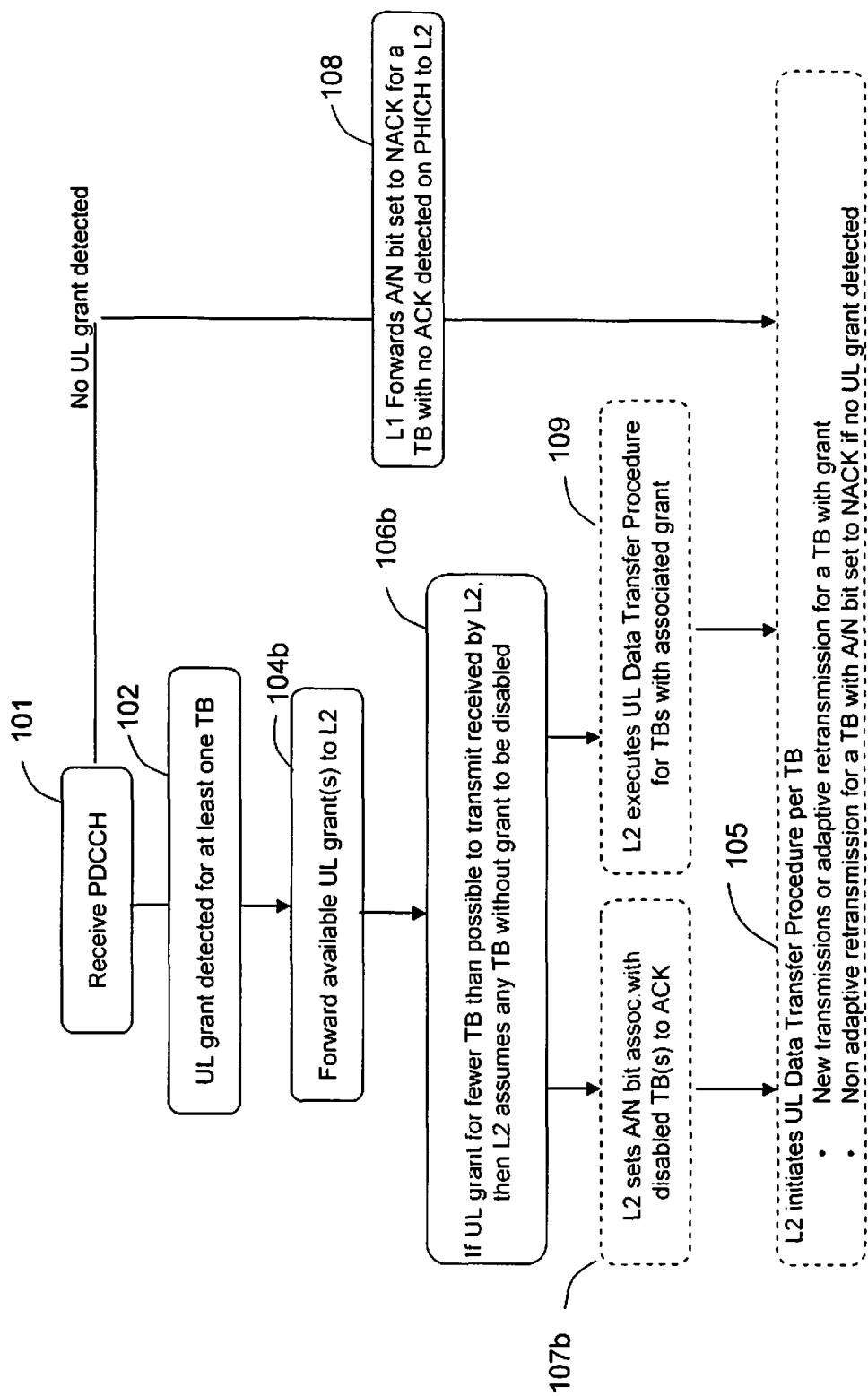

Another embodiment is illustrated in FIG. 1b, wherein instead of Layer 1 setting an ACK for a transport block without a valid grant to be delivered to a higher layer, said higher layer, e.g. Layer 2, assumes that an acknowledgement has been received for a transmission in previous TTI for a transport block for which no grant have been forwarded to the higher layer by the physical layer. This assumption may for example be made by setting the ACK/NACK flag to ACK for any transport block without a valid grant, see step 106*b*, before initiating the UL data transfer procedure. This embodiment is illustrated in FIG. 1*b*, in which steps 101, 102, 105 and 108 are identical to those in FIG. 1*a*. In step 104*b*, available grants are forwarded by Layer 1 to Layer 2. In step 106*b*, Layer 2 assumes any transport block for which no grant is forwarded from Layer 1 to be disabled. In a particular embodiment, a mechanism in Layer 2 sets an ACK/NACK flag to ACK in step 107*b* irrespective of what reception status feedback, i.e. ACK or NACK, it receives from Layer 1. In step 105, the UL data transfer procedure is then executed for each transport block. Still with reference to FIG. 1*b*, in another embodiment, Layer 2 will after assuming any transport block for which no grant is forwarded from L1 to be disabled in step 106*b*, perform the UL data transfer procedure only for the transport block with an associated grant, see step 109, which means that in this embodiment, Layer 2 will not read any ACK/NACK indication from Layer 1. For a transport block associated with a grant, this leads to an adaptive retransmission or a new code word transmission according to the associated grant. For the one or more transport blocks which do not have a grant, no retransmission is initiated from L2. In such embodiment the HARQ processes may communicate to each other whether a grant is received, and a HARQ process that has not received a grant may suspend itself if any other HARQ process has received a grant for that certain TTI. When there are no grants detected L1 executes non-adaptive retransmissions for TBs for which NACK is detected on PHICH, see step 108.

Figure 2A:
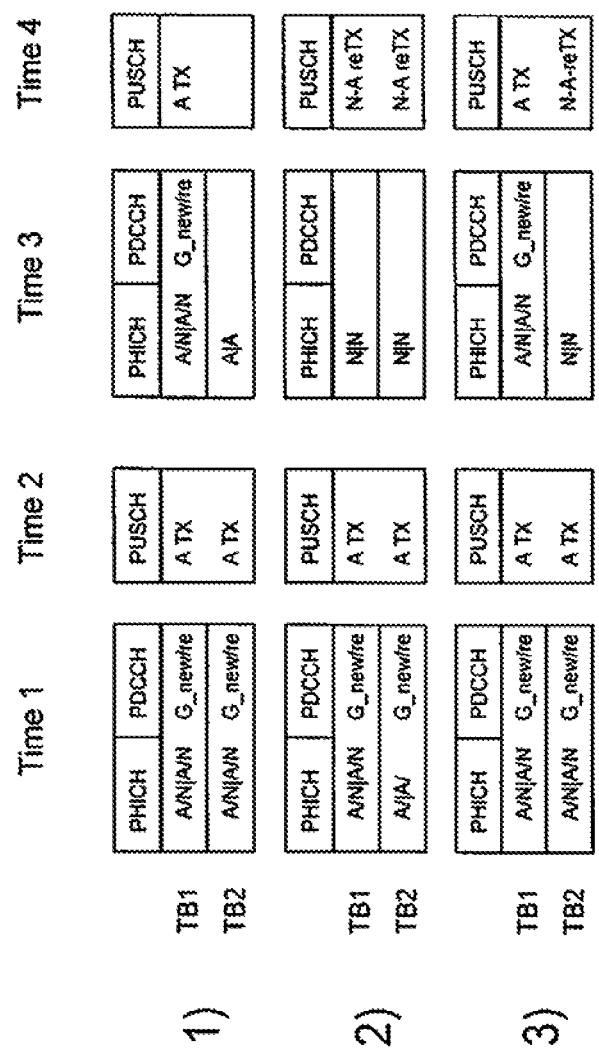
FIG. 2a-2b shows different scenarios for uplink spatial multiplexing.
Figure 2B:
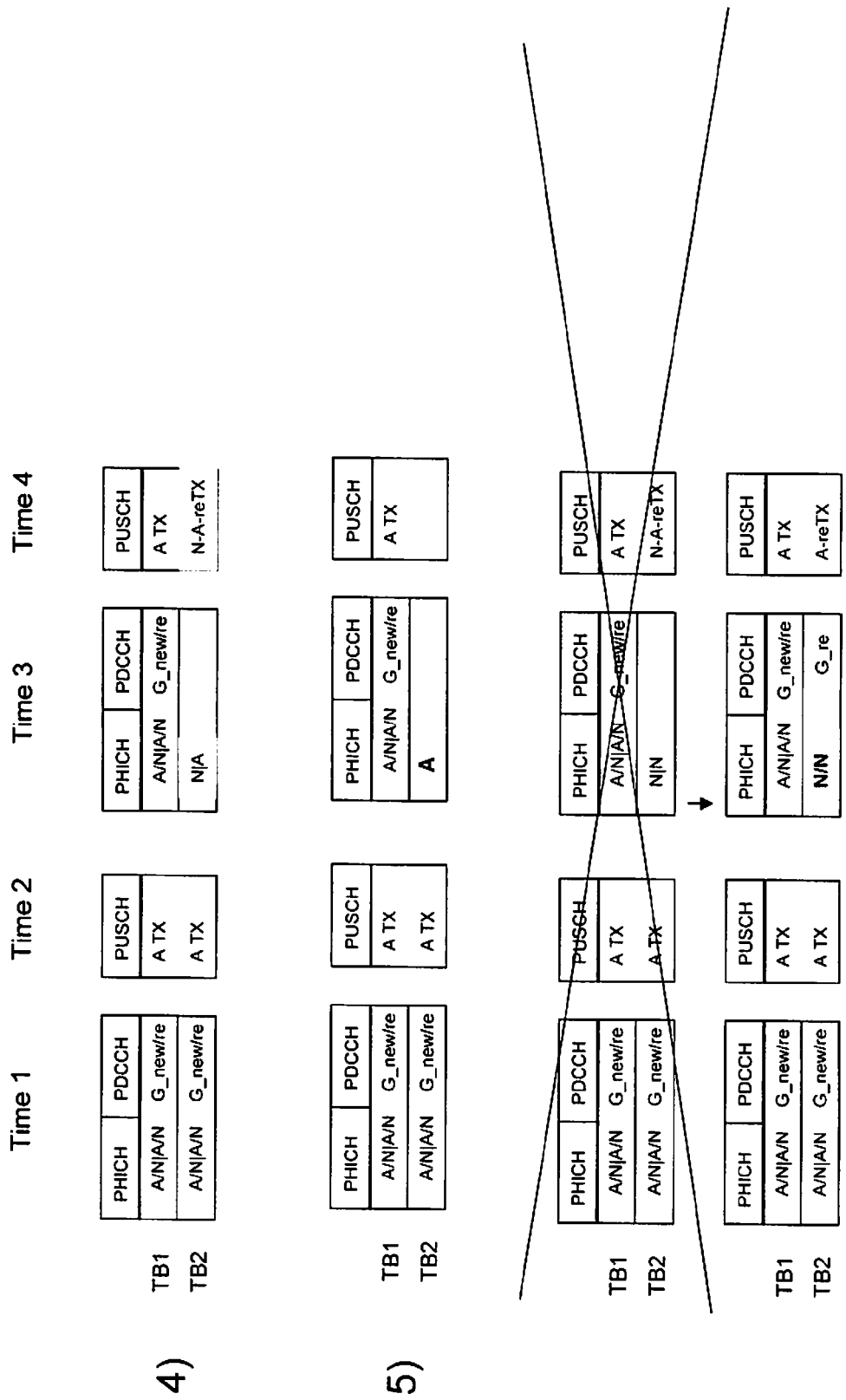

Applications of embodiments of the invention will also be illustrated with reference to FIGS. 2*a* and 2*b*. FIG. 2*a* illustrates prior art cases 1-3 without the invention, and FIG. 2*b* illustrates cases 4 and 5 where the invention is applied. In these cases it is assumed that two transport blocks, TB1 and TB2, can be spatially multiplexed.

Case 1

At Time 1, the UE decodes an ACK for TB1 given that an ACK is signaled on PHICH concerning an earlier UL transmission in TB1. At the same time, an UL grant for a new transmission at Time 1 is received on PDCCH. Alternatively, the UE decodes a NACK given that a NACK was signaled, then at the same time an adaptive retransmission at Time 2 of the failed code word is granted on PDCCH. One of the same two alternatives happens for TB2. Transport format adaptive transmissions (either new or re-transmissions) depending on grants at Time 1 are then transmitted on PUSCH at Time 2. For TB1, one of the same alternatives occurs for Time 3 and Time 4 as for Time 1 and Time 2. The TB2 transmission at Time 2 however is ACKed at Time 3 but for some reason a new transmission is not scheduled for TB2, e.g., the UE buffer might be empty, or it is believed that the MIMO channel is not sufficiently rich to hold multiple layers, or due to other scheduling decisions. Hence at Time 4 there is either a new transmission or a retransmission of TB1 according to its PDCCH grant at Time 3, but no transmission/retransmission of TB2.

Case 2

The same alternatives happen for Time 1 and Time 2 as for Case 1 described above. In this case, however, none of the transmissions of the TBs lead to successful reception and are both NACKed at Time 3. However, there are no new grants, e.g., there may not be sufficient PDCCH resources for ordering adaptive retransmissions of the two code words, hence the UE interprets the NACKs such that non-adaptive retransmissions are performed at Time 4.

Case 3

Again, the same two alternatives happen for Time 1 and Time 2 as for Case 1 described above. In this case, the transmission of one of the TBs at Time 2 is unsuccessful. Now only one of the transport blocks, say TB1, receives an UL grant on PDCCH at Time 3. If this TB was successfully decoded at Time 2, a new transmission at Time 4 is triggered by the grant or an adaptive retransmission at Time 4 is triggered if the previous transmission of the corresponding TB was a failure resulting in an adaptive retransmission grant. The other TB, referred to as TB2 in the FIG. 2*a*, which receives a NACK but no grant however would perform a non-adaptive retransmission. Assume now that the purpose of only one grant for TB1 was that we wanted the other TB, TB2, to be disabled, e.g., due to poor channel conditions, and suspend the retransmission, e.g., until more favorable channel conditions apply, then it is not possible to distinguish these two cases and TB2 will undesirably be subject to a L2 initiated non-adaptive retransmission. It should also be noted that information in the grant for TB1, e.g., precoder rank, may then also be conflicting with the non-adaptive transport format used for TB2 retransmission.

Case 4

Now suppose that the ACK for TB2 in Case 1 above is misinterpreted as a NACK, a non-adaptive retransmission of the corresponding code word will erroneously be triggered according to the current standards.

Case 5

The solution to the error Case 3 and 4 according to embodiments of the invention is to interpret disabling of the TB as an ACK to higher layers, which in this example means to let a grant valid for a single TB, as in this case, always mean an ACK for the TB without a valid grant irrespective of PHICH indication. This means that Case 3 cannot be used to trigger a non-adaptive retransmission at the same time as an adaptive re-transmission or new transmission. Instead, adaptive retransmission is used together with new transmissions or adaptive retransmission of the other TB. The risk that an accidental non-adaptive re-transmission is performed due to misinterpretation of the PHICH is avoided. The overhead of using a grant also for the other TB when an explicit grant on PDCCH is already being used for one TB is very limited or non-existent. Moreover, the performance is better for an adaptive retransmission than for a non-adaptive retransmission.

The two lower-most figures in case 5 illustrate how to signal the case where one wants to retransmit one TB due to a unsuccessful transmission while doing a new transmission or an adaptive retransmission for the other TB, see case 3 in FIG. 2.*a*. With the invention the content on PHICH and PDCCH as indicated in case 3 will be a disabling of TB2 as a single grant on PDCCH means ACK for TB2 irrespective of PHICH reception, hence the cross out of the second last subfigure in FIG. 2*b*. To achieve retransmission of the failed TB we explicitly grant the other TB as well, getting an adaptive re-transmission (as the PDCCH load is the same for a single TB grant or a two TB grant). Thus, it does not matter what is being transmitted on PHICH as PDCCH has precedence over PHICH (in principle no PHICH need to be transmitted, a fail to decode an ACK will be interpreted as NACK and even a decoded ACK (erroneous or not) will be ignored in favor of the PDCCH grant for the adaptive retransmission.

Thus, embodiments of the invention make the communication system more stable by preventing accidental non-adaptive re-transmission at practically no cost in the implementation.

Figure 3:
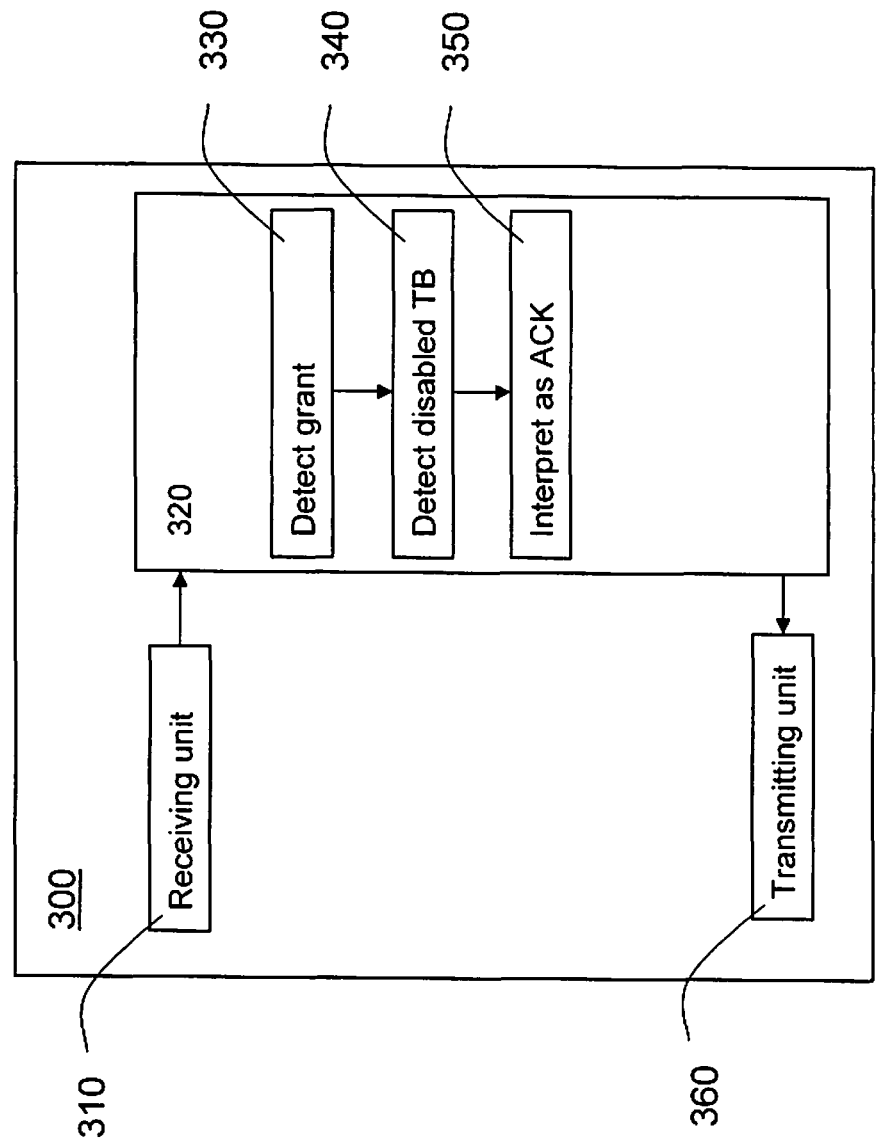
FIG. 3 illustrates schematically an arrangement according to embodiments of the invention.

FIG. 3 schematically illustrates an arrangement in a user equipment 300 in accordance with the invention that includes a receiving unit 310 configured for reading for example PDCCH and PHICH. The arrangement 300 furthermore includes a processing unit 320 that is configured to detect 330 a grant on a PDCCH that is valid for at least one transport block; to detect 340 that at least one transport block is disabled, such that no grant is associated with the at least one transport block; and to interpret 350 the at least one disabled transport block as reception of an acknowledgement message ACK, irrespective of the indication on the reception status feedback channel, e.g., the PHICH, for the transport block. The arrangement 300 also includes a transmitting unit 360 configured for sending information. It will be appreciated that the processing unit 340 can be one or more suitably programmed electronic processors or circuits and that the receiving unit 310 and transmitting unit 360 handle signals appropriate to the particular communication system, such as LTE channels and signals.

Figure 4:
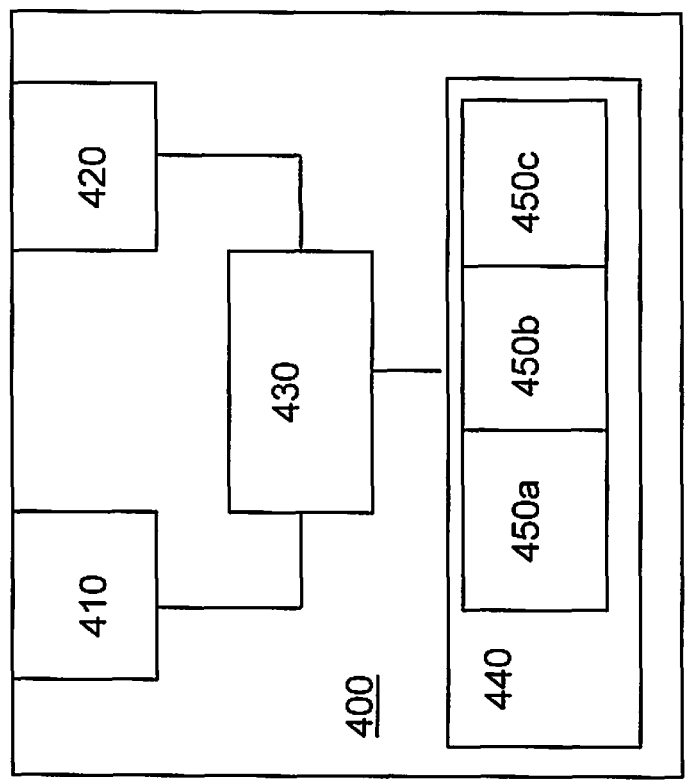
FIG. 4 illustrates in an alternative way an arrangement according to embodiments of the invention.

FIG. 4 schematically illustrates the arrangement 300 in an alternative way. The arrangement 400 comprises an input unit 410 and an output unit 420, and a processing unit 430, which may be a single unit or a plurality of units. The arrangement 400 further comprises at least one computer program product 440 in the form of a non-volatile computer-readable medium, e.g., an EEPROM, a flash memory, and a disk drive. The computer program product includes a computer program 450, which comprises program instructions which when run causes the processing unit 430 to perform the steps of the procedures described above in conjunction with FIGS. 1*a-b* and 3.

The program instructions, or code means, in the computer program 450 advantageously comprises a module 450*a* for detecting an uplink grant for at least one transport block, a module 450*b* for detecting that at least one transport block is disabled, and a module 450*c* for interpreting the at least one disabled transport block as reception of an acknowledgement message, ACK. The program 450 can thus be implemented as computer program code structured in computer program modules. The modules referred to above substantially perform the steps performed by the processing unit in FIG. 3. In other words, when the different modules are run on the processing unit, they correspond to the configured steps illustrated in FIGS. 1*a-b* and 3.

Although the program 450 in the embodiment illustrated by FIG. 4 can be implemented as computer program modules which when run on the processing unit cause the processing unit to perform steps described above in the conjunction with figures mentioned above, one or more of the code means 450 can in alternative embodiments be implemented at least partly as hardware circuits.

The present invention may, of course, be carried out in other ways than those specifically set forth herein without departing from essential characteristics of the invention. The present embodiments are to be considered in all respects as illustrative and not restrictive.

The invention claimed is:

1. A method for controlling re-transmission in a user equipment supporting uplink spatial multiplexing, comprising:
    detecting an uplink grant on a physical downlink control channel, the uplink grant being valid for at least one transport block;
    detecting that at least one transport block is disabled, such that no grant is associated with the at least one disabled transport block; and
    interpreting the at least one disabled transport block as an acknowledgement (ACK) indication of a previous transmission corresponding to the disabled transport block irrespective of an acknowledgement/non-acknowledgement (ACK/NACK) indication received on a reception status feedback channel for the previous transmission;
    wherein the detecting steps are carried out at a first protocol layer, and the interpreting step includes delivering the ACK indication h the first protocol layer to a second protocol layer; and
    wherein the first protocol layer is a physical layer and the second protocol layer is higher protocol layer.

2. The method of claim 1, wherein the interpreting step includes setting the ACK/NACK indication to an ACK indication.

3. The method of claim 1, further comprising using the ACK indication as an input in a hybrid automatic repeat request process corresponding to the disabled transport block in an uplink data transfer procedure.

4. A user equipment supporting uplink spatial multiplexing for controlling re-transmission, the user equipment including a processor configured to:
    detect an uplink grant on a physical downlink control channel, the grant being valid for at least one transport block;
    detect that at least one transport block is disabled, such that no grant is associated with the at least one disabled transport block; and
    interpret the at least one disabled transport block as an acknowledgement (ACK) indication of a previous transmission corresponding to the disabled transport block irrespective of an acknowledgement/non-acknowledgement (ACK/NACK) indication received on a reception status feedback channel for the previous transmission;
    wherein the processor is configured to deliver the ACK indication from a first protocol layer to a second protocol layer;
    wherein the first protocol layer is a physical layer and the second protocol layer is a higher protocol layer.

5. The user equipment of claim 4, wherein the processor is configured to set an ACK/NACK indication to an ACK indication.

6. The user equipment of claim 4, wherein the processor is configured to use the ACK indication as an input in a hybrid automatic repeat request process corresponding to the disabled transport block in an uplink data transfer procedure.

* * * * *

UNITED STATES PATENT AND TRADEMARK OFFICE
CERTIFICATE OF CORRECTION

| | | |
|---|---|---|
| PATENT NO. | : 9,136,986 B2 | Page 1 of 1 |
| APPLICATION NO. | : 13/318141 | |
| DATED | : September 15, 2015 | |
| INVENTOR(S) | : Abrahamsson et al. | |

It is certified that error appears in the above-identified patent and that said Letters Patent is hereby corrected as shown below:

In the Specification

In Column 9, Line 13, delete "processing unit 340" and insert -- processing unit 320 --, therefor.

In the Claims

In Column 10, Line 17, in Claim 1, delete "h" and insert -- by --, therefor.

In Column 10, Line 20, in Claim 1, delete "is higher" and insert -- is a higher --, therefor.

Signed and Sealed this
Twenty-sixth Day of April, 2016

Michelle K. Lee
*Director of the United States Patent and Trademark Office*